United States Patent
Schaefer et al.

(10) Patent No.: US 8,720,978 B2
(45) Date of Patent: May 13, 2014

(54) MOTOR VEHICLE BODY

(71) Applicant: GM Global Technology Operations LLC, Detroit, MI (US)

(72) Inventors: Joachim Schaefer, Darmstadt (DE); Uwe Schmitz, Nauheim (DE); Stefan Wolff, Hochheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/744,117

(22) Filed: Jan. 17, 2013

(65) Prior Publication Data

US 2013/0193715 A1    Aug. 1, 2013

(30) Foreign Application Priority Data

Jan. 19, 2012   (DE) .......................... 10 2012 001 024

(51) Int. Cl.
B62D 25/08 (2006.01)

(52) U.S. Cl.
USPC ..................... 296/192; 296/187.04

(58) Field of Classification Search
USPC ..................... 296/187.04, 192, 201
See application file for complete search history.

(56) References Cited

U.S. PATENT DOCUMENTS

| | | | |
|---|---|---|---|
| 7,004,534 B2 * | 2/2006 | Yoshii et al. .................. | 296/192 |
| 7,552,964 B2 * | 6/2009 | Saito ............................ | 296/192 |
| 8,523,264 B2 * | 9/2013 | Kuroki et al. ............. | 296/96.21 |
| 8,528,964 B2 * | 9/2013 | Walter et al. ............. | 296/187.04 |
| 2005/0134089 A1 * | 6/2005 | Borkowski et al. .......... | 296/192 |
| 2007/0102222 A1 * | 5/2007 | Tanaka ......................... | 180/291 |
| 2011/0304177 A1 * | 12/2011 | Walter et al. ................. | 296/201 |
| 2013/0127206 A1 * | 5/2013 | Ringel et al. ................. | 296/192 |
| 2013/0187408 A1 * | 7/2013 | Schaefer ....................... | 296/192 |
| 2013/0257102 A1 * | 10/2013 | Schaefer et al. ............. | 296/192 |

FOREIGN PATENT DOCUMENTS

| | | |
|---|---|---|
| DE | 102009058285 A1 | 6/2011 |
| DE | 102011018388 A1 | 11/2011 |
| DE | 102010023281 A1 | 12/2011 |
| EP | 1810892 A1 | 7/2007 |
| JP | 2001354163 A | 12/2001 |
| JP | 2006007982 A | 1/2006 |

OTHER PUBLICATIONS

German Patent Office, German Search Report for Application No. 10 2012 001 024.9 dated Sep. 6, 2102.

* cited by examiner

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A motor vehicle body with a front hood, a front window rising from a rear edge of the front hood, and an elongated cross member is provided. The elongated cross member includes a middle region curved channel-like in section in a vehicle longitudinal direction. A contact zone of the elongated cross member supports a lower edge of the front window and a longitudinal end supports the elongated cross member. A transition region is between the longitudinal end and the middle region and, in section in the vehicle longitudinal direction, is less curved than the middle region.

11 Claims, 3 Drawing Sheets

MOTOR VEHICLE BODY

CROSS-REFERENCE TO RELATED APPLICATION

This application claims priority to German Patent Application No. 102012001024.9, filed Jan. 19, 2012, which is incorporated herein by reference in its entirety.

TECHNICAL FIELD

The technical field relates to a motor vehicle body having a front hood, a front window rising from a rear edge of the front hood and a cross member supporting a front lower edge of the front window.

BACKGROUND

From DE 10 2009 058 285 A1 a motor vehicle body having a front hood and a front window rising from a rear edge of the front hood is known, with which a cross member curved channel-like over its entire length forms a contact zone. The cross member supports the front window on a front edge extending in vehicle transverse direction and the lateral ends and a rear edge of the cross member are supported on structural components of the body.

When this vehicle touches a pedestrian in traffic, the latter normally crashes onto the hood from the top, wherein the pedestrian pivots about an axis which is located approximately at the front edge of the hood. With an adult pedestrian of normal size, the head in this case mostly hits the front window, passing through it and deforming the cross member located below. In a middle region, the cross member is somewhat easily yielding. For this reason, the head in an initial phase of the contact is exposed to a relatively strong deceleration when passing through the front window; this relatively easy deformability after passing through the front window allows achieving low values of the head injury criterion (HIC) during an impact in the middle of the front window.

However, when the head impacts near the ends of the cross member, their anchorage to the structural components of the body leads to a significantly higher deformation resistance and thus also to higher HIC-values.

From EP 1 810 892 B1 another motor vehicle body having a cross member that is curved channel-like over its entire length has become known. With this conventional motor vehicle, an upper side wall of the channel, against which the front window bears, and a lower side wall of the channel supported on a structural component of the body substantially extend on top of each other so that an open side of the channel faces the passenger cell. Since the upper side wall of the channel is not separately supported on a structural component, the lateral ends of this upper side wall are significantly more easily deformable under the pressure of an impact than a middle region. There is therefore the risk that the deceleration effect of the cross member during an impact on a lateral edge region of the front window is insufficient and upper and lower side wall strike against each other under the force of the impact. When this happens, extreme decelerations occur which in turn result in undesirably high HIC-values.

At least one object herein is to create a motor vehicle body that avoids an excessive dependency of the HIC-value on the location of the impact on the front window and allows achieving low HIC-values over the entire width of the front window. In addition, other objects, desirable features and characteristics will become apparent from the subsequent summary and detailed description, and the appended claims, taken in conjunction with the accompanying drawings and this background.

SUMMARY

In an exemplary embodiment, a motor vehicle body with a front hood and a front window rising from a rear edge of the front hood has an elongated cross member which in a middle region is curved channel-like in section in vehicle longitudinal direction and comprises a contact zone supporting a lower edge of the front window, and which is supported on at least one of its longitudinal ends. The cross member furthermore comprises a transition region between the supported longitudinal end and the middle region, which in section in vehicle longitudinal direction is less curved than the middle region.

In an embodiment, this transition region should not itself directly support the front window in order to be deformable without interaction with the front window during an impact.

The transition region can be linear in section in vehicle longitudinal direction and bounded towards the front by an edge of the cross member facing the front window.

When the rear edge of the cross member is supported on a structural component of the body, the transition region towards the rear can also be bounded by a bending zone, for a stiffening caused through such a bending zone has no effect or at least not a decisive one on the deformation behavior of the cross member since this region is generally not deformed during an impact.

In one embodiment, the transition region is flat, i.e. it is linear not only in section in vehicle longitudinal direction but also in a section plane running in vehicle transverse direction.

In order to achieve a satisfactory effect, in another embodiment, the transition region in vehicle transverse direction has an extension of about several centimeters.

On the longitudinal end, the cross member can comprise an angled-off fastening flange for fastening to a structural component of the body.

For example, an A-pillar can be considered as a structural component, which supports the longitudinal end of the cross member.

In order to be able to make the contact zone between the front window and the cross member as long as possible, in an embodiment the transition region extends in vehicle transverse direction beyond a lateral edge of the front window.

The contact zone however, can also clear a lateral edge region of the front window, so that behind this edge region of the front window at least one part of the transition region of the cross member can be accommodated. In this edge region, the front window can be practically supported by a strap projecting from the A-pillar.

This strap practically engages into an intermediate space between the transition region of the cross member and the edge region of the front window.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
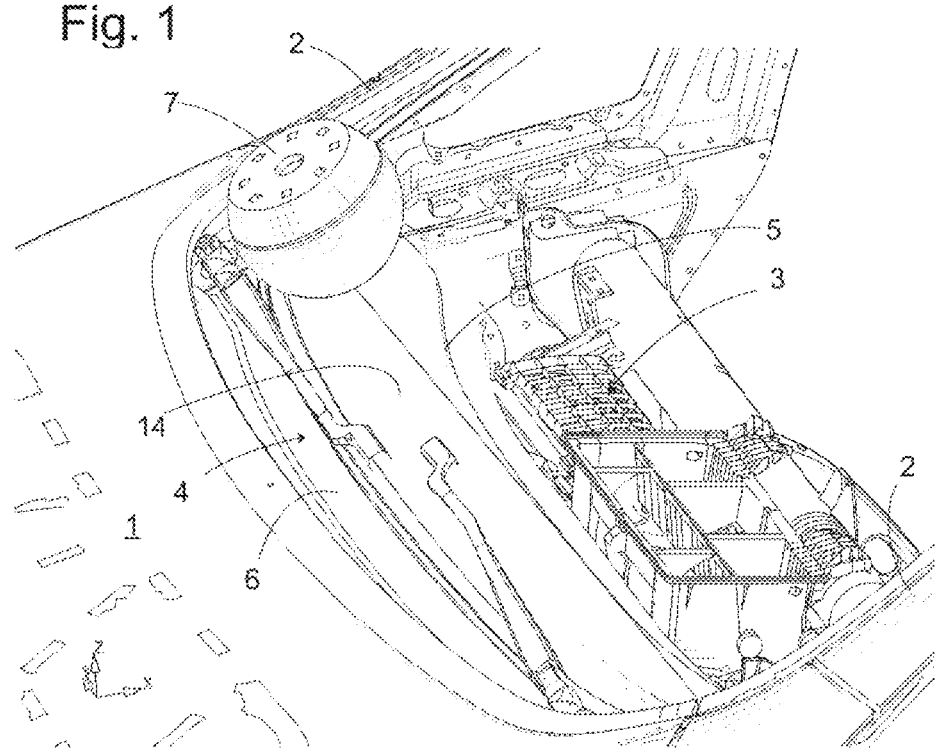
FIG. 1 is a perspective view of a part of a motor vehicle body according to an exemplary embodiment and of an impactor simulating the impact of the head of a pedestrian on the body.

FIG. 1 shows a perspective view of a part of a motor vehicle body. Visible is the rear region of a front hood 1 and a window opening following thereon which with the finished vehicle receives a front window, flanked by A-pillars 2. A dashboard covering extending under the front window with the finished vehicle is omitted in FIG. 1 in order to be able to show installations 3 of the dashboard and a cross member 4 located below, which with the finished vehicle are concealed under the dashboard covering. The shape of the cross member 4 is plate-like in the sense that it can be formed through three dimensional deformation of a cutting of flat material, in particular through forming sheet steel. It is also conceivable to place cuttings of fiber material onto a die and press these together under the effect of heat in order to produce the cross member 4 from fiber-reinforced plastic.

A rear flange 5 of the cross member 4 supports itself on the upper edge of a separating wall that is not visible in the Figure, which extends between passenger cell and engine compartment. Here, the flange 5 is horizontally oriented and flat. A front flange 6 of the cross member 4 that is sloping towards the front forms a contact zone which supports a front lower edge of the front window to be mounted in the window opening. Corresponding to the curvature of this front window, the front flange 6 is curved in a section plane extending in vehicle transverse direction. The different shapes and orientations of the flanges 5, 6 bring about that a closed-walled centerpiece 14 unitarily connecting these is channel-like in a section plane oriented in vehicle longitudinal direction with convex side facing up, wherein an apex line of the channel shape, designated 8 in FIG. 2, follows the curvature of front window and flange 6.

Figure 2:
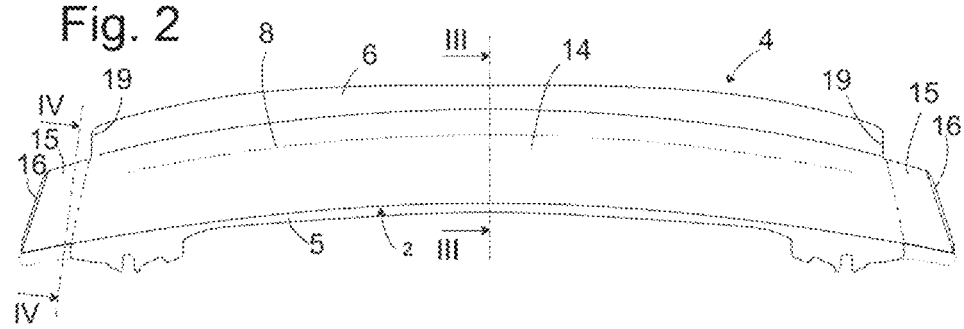
FIG. 2 is a top view of the cross member of the motor vehicle body from FIG. 1.
Figure 3:
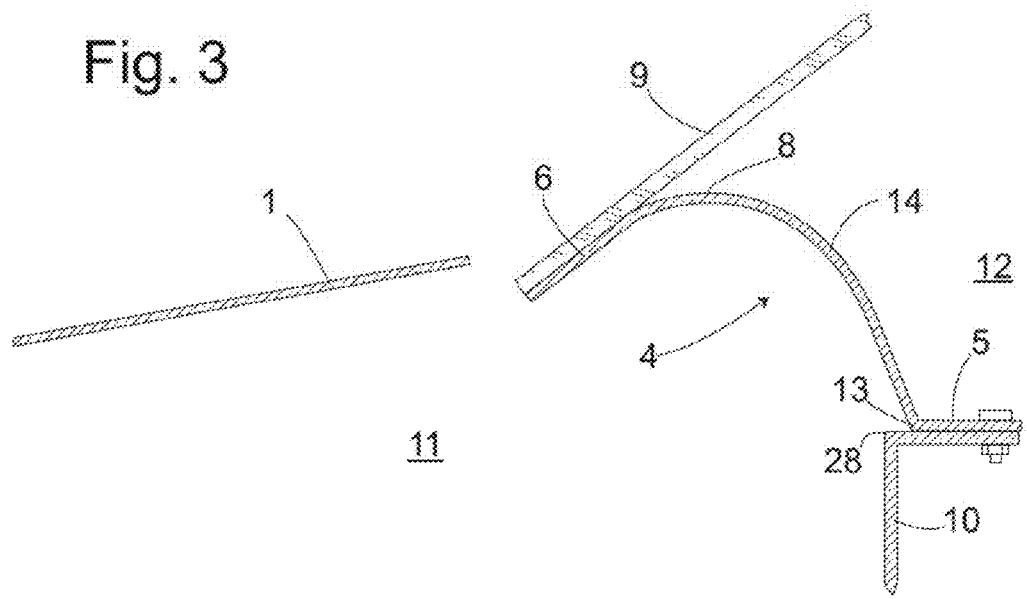
FIG. 3 is a schematic cross section through the body parts shown in FIG. 1 and their substructure along the section plane designated III-III in FIG. 2 and extending in longitudinal direction of the motor vehicle body.

FIG. 3 shows the cross member 4 and its surroundings in a schematic section in vehicle longitudinal direction, along the plane III-III from FIG. 2. Visible is a rear region of the front hood 1 and in each case a part of the front window here designated 9 and of the separating wall between engine compartment 11 and passenger cell 12, designated 10. On an upper edge of the separating wall 10 a horizontal support surface is formed, on which the flange 5 is supported and fastened via a large contact area, for example with the help of spot welds or other suitable connecting or joining techniques. A highly curved or bent bending zone 13 extends in vehicle transverse direction between the flange 5 and the centerpiece 14.

In an embodiment, the curvature of the centerpiece 14 of the cross member 4 connecting the flanges 5, 6 is at a maximum on the section plane III-III centrally running through the cross member 4 and continuously decreases from there in lateral direction until it finally disappears approximately at the height of the ends 19 of the flange 6, and flat transition regions 15, as shown in FIG. 2, laterally extend in extension of the centerpiece 14. The dash-dotted lines marking the boundaries between the centerpiece 14 and the transition regions in FIG. 2 merely serve for the orientation of the beholder; in practice, a distinct boundary is not necessarily visible between the two. The transition regions 15 each end on fastening flanges 16 which are substantially angled off vertically.

Figure 4:
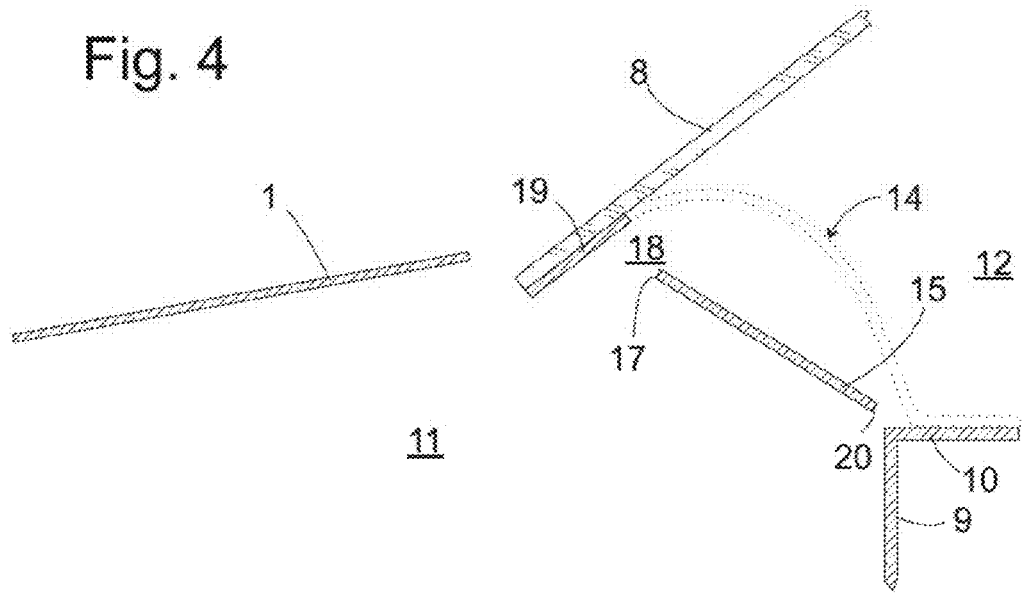
FIG. 4 is a cross section analogous to FIG. 3 along the section plane IV-IV from FIG. 2.

FIG. 4 shows a section in vehicle longitudinal direction through one of the transition regions 15, wherein the cross-sectional curve of the centerpiece 14 in the plane III-III is drawn in as dotted outline for comparison. In an exemplary embodiment, a front edge 17 of the transition region 15 is separated from the front window 9 through a gap 18. A rear edge 20 of the transition region 15 does not reach as far as to the separating wall 10 here either. The angle, with which the transition region 15 rises towards the front, offers a further possibility of optimizing the HIC dependent on the stiffness and the deformation behavior of the surrounding structures and the window position.

In one embodiment, when the impactor 7 strikes the front window 9 adjacent to one of the ends 19 of the flange 6, the flange 6 is displaced downwards because of this and the centerpiece 14 pivots, possibly accompanied by a compression, at least in the surroundings of the impact point about an axis running along the bending zone 13. In that the fastening flange 6 is fastened to the adjacent A-pillar 2, the transition region 15 can follow this movement only to a limited extent and is subject to a screw deformation. Because of this, the deformation resistance of the cross member 4 during an impact of the impactor 7 on one of the ends 19 of the flange 6 is similarly high as with an impact in the middle of the flange 6.

With the cross member 4 shown in FIG. 2 the rear flange 5, like the front flange 6, in an embodiment, ends at the height of a transition from the curved centerpiece 14 to the flat transition region. Since, however, the course of the rear edge 20 of the transition region 15 hardly changes through the screw deformation during an impact, the rear flange 5, as shown as dotted outline in FIG. 2, can also be extended as far as into the transition region 15, if this proves practical for standardizing the deformation resistance along the cross member 4. In this case, the cross member along the section plane IV-IV is not linear on its entire cross section as shown in FIG. 4, but only the transition region solely affected by deformation during an impact is linear.

Since the flange 6 does not support the lower edge of the front window 8 over its entire width, the front window 9 can be relatively sensitive in particular in its lateral edge regions located in front of the transition regions 15 if no suitable countermeasures are taken. In order to stabilize the front window 9 as far as to its lateral edges, in an embodiment, straps 21 each projecting into the window opening are therefore provided on the A-pillars 2, which in place of the flange 6 support the front window 9 at the height of the transition regions 15.

Figure 5:
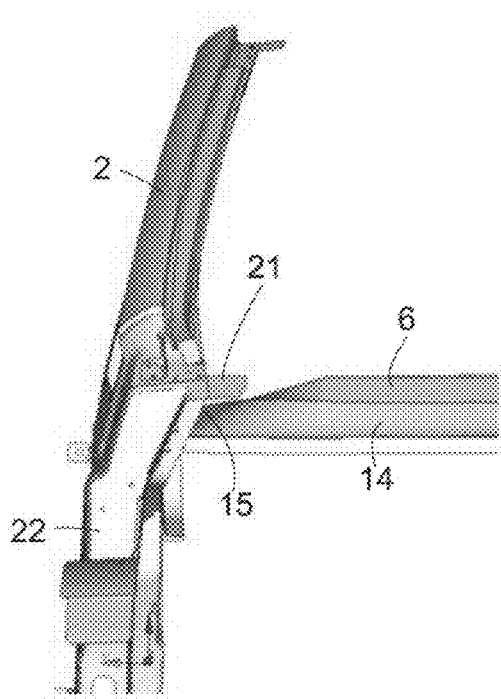
FIG. 5 is a partial front view of a cross member according to an exemplary embodiment and of body parts supporting the latter.

Such a strap 21 is clearly noticeable in FIG. 5, which shows a partial view of the cross member 4, of an A-pillar 2 and of a fender element 22 extending the A-pillar towards the bottom. The flange 6 ends spaced several centimeters from the A-pillar 2 and the strap 21 projecting from the A-pillar 2 largely fills out the gap formed thus. The transition region projects laterally beyond the edge of the window opening, so that a part of the transition region 15 and the fastening flange 6 are conceived behind a front wall of the fender element 22 facing the beholder.

Figure 6:
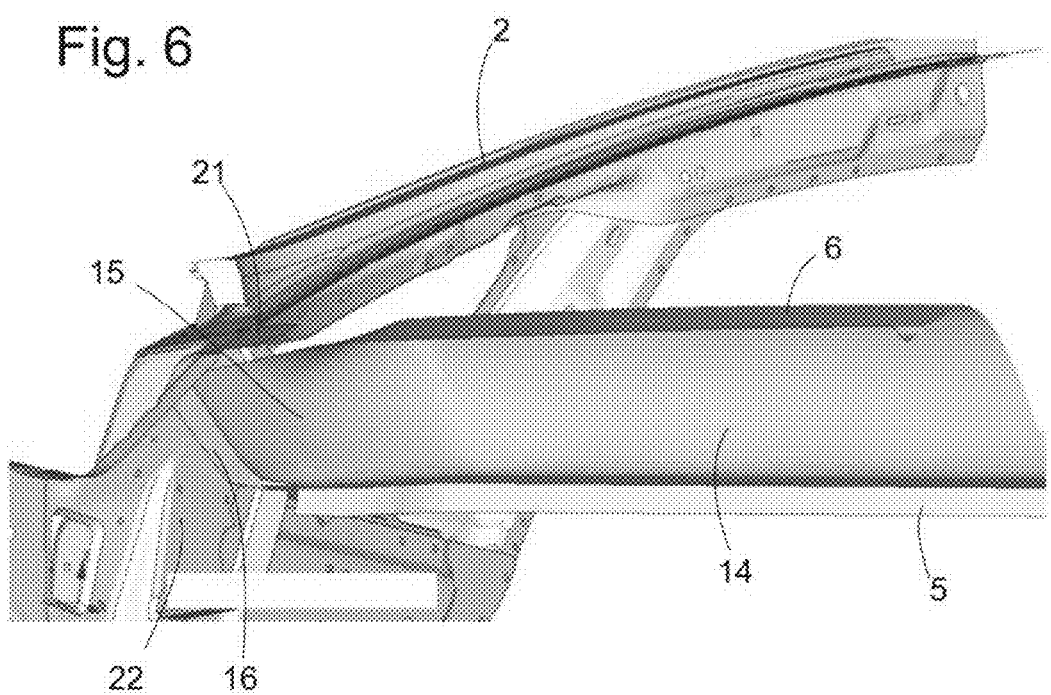
FIG. 6 is a cross member according to an exemplary embodiment and the body parts supporting it, seen from a viewpoint in the engine compartment.

FIG. 6 shows the same components as FIG. 5 in a perspective view obliquely from below, seen from the engine compartment. Clearly noticeable is the elongated channel shape of the centerpiece 14, which decreases towards the flat transition region 15 and the fastening flange 16 bearing against a wall of the A-pillar 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
   a front hood;
   a front window rising from a rear edge of the front hood; and
   an elongated cross member comprising:
      a middle region curved channel-like in section in a vehicle longitudinal direction;
      a contact zone supporting a lower edge of the front window;
      a longitudinal end that supports the elongated cross member;
      a transition region between the longitudinal end and the middle region, which in section in the vehicle longitudinal direction is less curved than the middle region.

2. The motor vehicle body according to claim 1, wherein the transition region does not support the front window.

3. The motor vehicle body according to claim 1, wherein the transition region is linear in section in the vehicle longitudinal direction and towards a front is bounded by an edge of the elongated cross member facing the front window.

4. The motor vehicle body according to claim 1, wherein the transition region is bounded towards a rear by a bending zone.

5. The motor vehicle body according to claim 1, wherein the transition region is flat.

6. The motor vehicle body according to claim 1, wherein the transition region has an extension of about several centimeters in a vehicle transverse direction.

7. The motor vehicle body according to claim 1, wherein the elongated cross member on the longitudinal end comprises an angled-off fastening flange.

8. The motor vehicle body according to claim 1, wherein an A-pillar supports the longitudinal end of the elongated cross member.

9. The motor vehicle body according to claim 1, wherein the transition region extends in a vehicle transverse direction beyond a lateral edge of the front window.

10. The motor vehicle body according to claim 1, wherein the contact zone in which the lower edge of the front window touches the elongated cross member clears a lateral edge region of the front window and the front window in the lateral edge region is supported on a strap projecting from an A-pillar.

11. The motor vehicle body according to claim 10, wherein the strap extends between the transition region of the elongated cross member and the lateral edge region of the front window.

* * * * *